United States Patent [19]

Cuer et al.

[11] 4,169,880
[45] Oct. 2, 1979

[54] METHOD OF TREATING NITRIC EFFLUENTS

[75] Inventors: Jean-Pierre Cuer, Francheville le Haut; Antoine Floreancig; Jean Wojcik, both of St. Genis Laval, all of France

[73] Assignee: Produits Chimiques Ugine Kuhlmann, Paris, France

[21] Appl. No.: 845,606

[22] Filed: Oct. 26, 1977

[30] Foreign Application Priority Data

Nov. 2, 1976 [FR] France .............................. 76 32949

[51] Int. Cl.² .............................................. B01D 11/04
[52] U.S. Cl. ...................................... 423/166; 210/21; 423/396
[58] Field of Search ....................... 423/396, 555, 166; 210/21

[56] References Cited

U.S. PATENT DOCUMENTS 3,966,594  6/1976  Ohkawa et al. ........................ 210/21
3,983,222  9/1976  Lehto ..................................... 210/21

FOREIGN PATENT DOCUMENTS 2302563  8/1973  Fed. Rep. of Germany ............. 210/21
2350962  4/1974  Fed. Rep. of Germany ............. 210/21
50-122057  9/1975  Japan ....................................... 210/21

Primary Examiner—O. R. Vertiz
Assistant Examiner—Wayne A. Langel
Attorney, Agent, or Firm—Brooks, Haidt, Haffner & Delahunty

[57] ABSTRACT

Processes for treating nitric effluents from plants so that a non-polluting stream is obtained and nitric values are recovered, which processes comprise acidifying nitric effluent, liquid-liquid extraction of the acidified effluent with an extraction agent comprising a neutral phosphoric ester and at least one long-chain alkylamine, and re-extraction of the loaded extraction agent with ammonia, thereby regenerating the extraction agent and providing ammonium nitrate, while at the same time providing a substantially nitric-free effluent.

14 Claims, 1 Drawing Figure

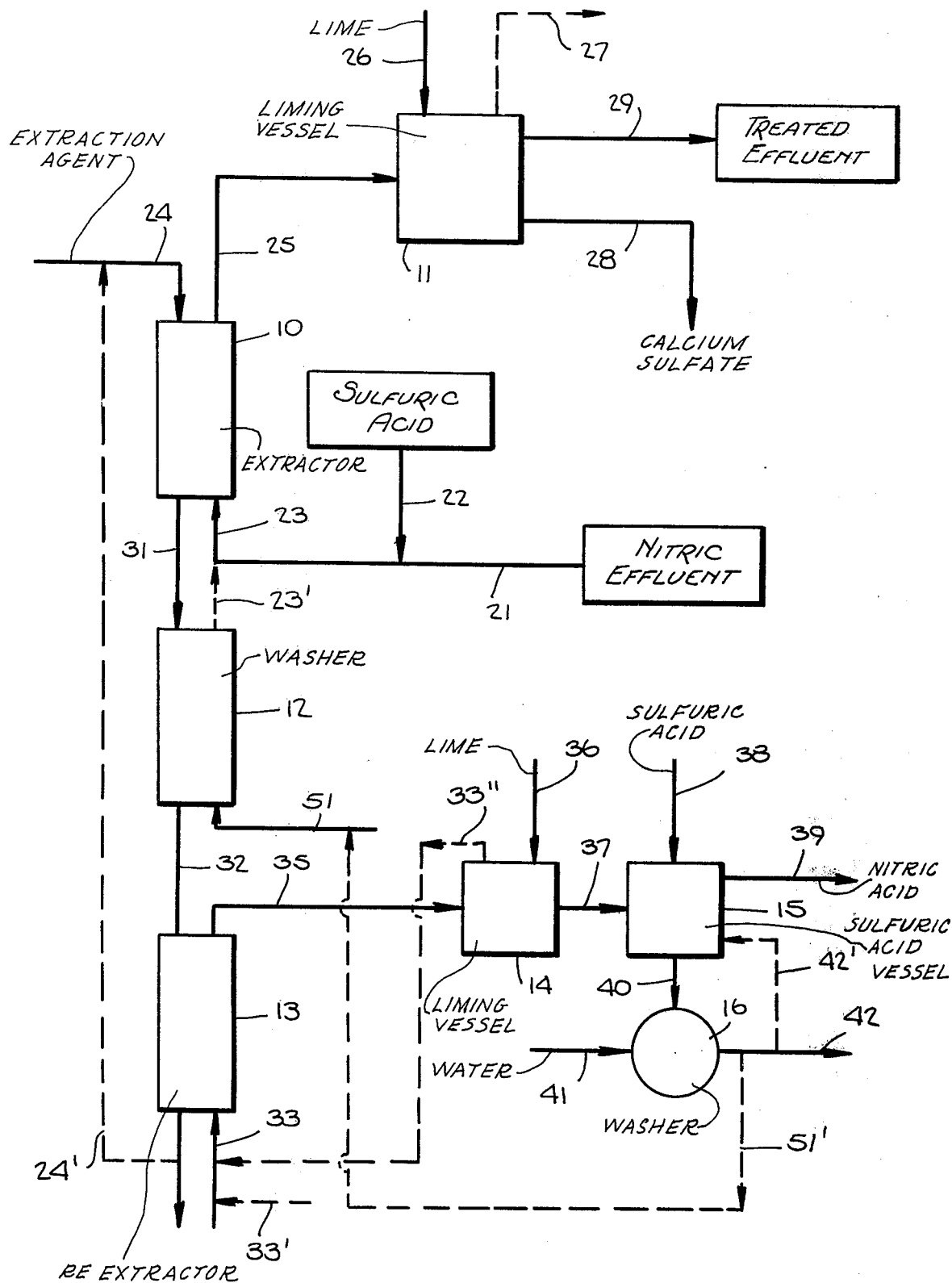

METHOD OF TREATING NITRIC EFFLUENTS

BACKGROUND OF THE INVENTION

The present invention relates to processes for treating nitric-containing effluents from nitric acid production plants or nitric acid-using plants, such as hydrometallurgical treatment plants for cobalt or for uranium ores, and more specifically it relates to novel treatment methods which permit recovery of the nitric values.

Effluents containing nitric acid and nitrate ions cannot be discharged as such without risk of pollution by said ions. Hence, numerous methods of treating said effluents have been proposed. Noteworthy among the latter is the method described in French Pat. No. 2,087,565 of the Commissariat à l'Energie Atomique (French Atomic Energy Commission). According to this method, the effluent is treated with calcium hydroxide and the resulting calcium nitrate is treated with sulfuric acid; in this way one obtains, depending on the conditions, ammonia, calcium sulfate (which precipitates), and nitric acid. This method has the disadvantage of creating a dilute solution of nitric acid which cannot be recycled without burdensome concentration.

Other methods have been proposed, including the method described in the article "Récupération de l'acide nitrique par extraction par solvant" ("Recuperation of Nitric Acid By Solvent Extraction"), BIST (Commissariat à l'Energie Atomique—French Atomic Energy Commission), No. 185, Oct. 1973. This method which involves extraction by a solvent (tributylphosphate) has the disadvantage of producing a dilute nitric acid, whilst necessitating a large number of extraction stages.

THE INVENTION

The present invention provides a method employing solvent extraction which makes it possible, in a small number of stages, to recover the nitrate ions contained in the effluent, in the form of pure ammonium nitrate. The present invention also makes it possible to obtain concentrated nitric acid without additional concentration. Thus, the processes of this invention greatly improve the utilization of dilute nitric effluents.

As has been stated, the method of the invention employs the solvent extraction technique. In order to perform a solvent extraction on a dilute nitric effluent, the effluent is first treated with an acid, such as sulfuric acid, which supplies the necessary free acidity.

Throughout the present disclosure, the term "nitric effluent" designates a liquid effluent containing free nitric acid and/or nitrate ions with the corresponding cations.

The method of the present invention is based upon the surprising discovery that the combination of a solvent of the neutral phosphoric ester type and of a solvent of the long-chain amine type makes it possible to extract the nitric acid efficaciously without extracting the sulfuric acid and without necessitating a large number of extraction stages.

Solvents of the neutral phosphoric ester type, more particularly tributylphosphate (TBP) are known as extraction agents for nitric acid. In this respect, reference may be made to "The distribution of $HNO_3$ at low concentrations between $H_2O$ and TBP" of AERE HARWELL, HL M 2635, May 1975, pages 1 to 13.

However, solvents of this type have a relatively low coefficient of extraction for nitric acid. Long-chain amines are likewise known as extraction agents for nitric acid, but they present the disadvantage of being likewise capable of extracting sulfuric acid.

It has now unexpectedly been discovered that a mixture of the two solvents, that is, neutral phosphoric ester plus amine, makes it possible to extract nitric acid efficaciously without extracting the sulfuric acid, whereas the ester alone is comparatively ineffective and the amine alone extracts nitric and sulfuric acids simultaneously.

Briefly, the process of the present invention comprises the following steps:

(a) Treatment of the nitric effluent with sulfuric acid in a quantity at least equivalent to the nitrates;

(b) Liquid-liquid extraction of the solution resulting from the foregoing step by an extraction agent comprising a combination of a neutral phosphoric ester and of at least one long-chain amine to dissolve nitric values in the solvent; and (c) Re-extraction of the nitric value-containing solvent with gaseous or aqueous ammonia. In this way a concentrated solution of ammonium nitrate is obtained without sulfate, and also the regenerated solvent is recycled to step (b).

In a preferred embodiment of the invention [also called step (b')], the aqueous raffinate from step (b) can be treated by lime, which depending upon the conditions can generate gaseous ammonia and cause precipitation of metallic hydroxides and calcium sulfate. In another preferred embodiment, the nitric value-containing solvent can be washed, prior to the re-extraction. This latter embodiment is also referred to herein as step (b").

The invention is further described with reference to the accompanying FIGURE, which is a flow diagram of a preferred process.

Since the ammonium nitrate obtained contains no sulfate ions which would lower its nitrogen titre, it can advantageously be used as a fertilizer. The ammonium nitrate can also be treated to obtain concentrated nitric acid, the treatment steps being as follows:

(d) Addition of lime to the concentrated solution of ammonium nitrate originating from step (c). In this way calcium nitrate is obtained as well as ammonia which is recycled to step (c).

(e) Treatment of the calcium nitrate solution by sulfuric acid. In this way, concentrated nitric acid is obtained which can be used directly, as well as calcium sulfate which precipitates and is separated by filtration.

(e') Optionally washing the calcium sulfate filter cake with water, which leads to a dilute nitric acid solution which can be recycled to stage (c) for washing the solvent containing the nitric values.

The sulfuric acid from step (a) can be reintroduced into the effluent to be treated, into the recycled solvent, or at any point of the extraction operation.

The neutral ester is desirably a trialkylphosphate, with the alkyl chains being lower alkyl. A preferred neutral phosphoric ester is tributylphosphate (TBP).

The long-chain amines which can be used according to the invention are chosen from among secondary and tertiary amines, and desirably from among alkylamines having from 18 to 36 carbon atoms. Among the amines which can be used according to the invention, the tertiary amines are particularly preferred, and among these trilaurylamine and normal or branched octylamine are particularly preferred in certain embodiments.

The extraction agent comprised by the amine (s)-phosphoric ester combination can be diluted with an aromatic or paraffinic hydrocarbon vehicle having low water solubility and low volatility. Kerosene and dodecane are exemplary of two preferred hydrocarbons. By way of example, the solvent of the invention can contain from 100 to 500 g/L of phosphoric ester and from 100 to 500 g/L of amine or amines in the vehicle being used.

The optional washing of step (b'') can be performed with the dilute nitric acid solution originating from step (e'), as has been explained hereinbefore, and also with an effluent solution of alkaline nitrates which can be obtained from another part of the plant and free of impurities such as $Fe^{+++}$ or $SO_4^{--}$.

The re-extraction of the nitric-loaded solvent from stage (c) can be performed with ammonia, a part of which can originate, for example, from the lime treatment of the ammonium nitrate originating from the re-extraction, as has been explained hereinbefore. It may also be carried out by means of available ammoniacal solutions to which ammonia has been added.

The present invention is further described with reference to the accompanying drawing which illustrates schematically an example of a treatment plant for dilute nitric effluents.

The nitric effluent to be treated is introduced into conduit 21, sulfuric acid is added through conduit 22, and the resulting mixture is introduced through conduit 23 into extractor 10. The extraction solvent of neutral phosphoric acid and amine according to the present invention is charged to extractor 10 by means of conduit 24.

The raffinate, containing sulfate ions and a very small quantity of nitric ions, is withdrawn from extractor 10 through conduit 25 and introduced into vessel 11. Lime is added to vessel 11 through conduit 26. Any ammonia generated is removed through conduit 27, and precipitated calcium sulfate is removed through conduit 28, while a liquid effluent substantially free of sulfate and nitrate ions is withdrawn through conduit 29.

The solvent loaded with nitric acid is withdrawn from extractor 10 through conduit 31 and washed in optional washer 12. The washing liquor withdrawn through conduit 23' is optionally combined with the sulfuric acid-treated nitric effluent and fed to extractor 10. This washing of the loaded solvent removes impurities, certain of which can precipitate during the following re-extraction and can thus render the re-extraction very delicate.

The washed nitric acid-containing solvent is removed from washer 12 via conduit 32 and introduced into re-extractor 13 where it is treated with ammonia introduced through conduit 33. In an alternative embodiment, an ammonium nitrate solution can be introduced through conduit 33' and used as the re-extracting agent.

The regenerated solvent from re-extractor 13 is recycled through line 24' to extractor 10, and concentrated ammonium nitrate solution is withdrawn from re-extractor 13 through line 35. The ammonium nitrate can be recovered as such, or else it can be treated in vessel 14 with lime introduced via conduit 36.

The ammonia resulting from the lime treatment can be withdrawn through conduit 33'' which is connected to conduit 33, so that the ammonia can be recycled to re-extractor 13.

Calcium nitrate solution is withdrawn from vessel 14 through conduit 37 and introduced into vessel 15 where it is treated with sulfuric acid introduced through line 38. Concentrated nitric acid removed through conduit 39 is recovered and is ready for re-use.

Calcium sulfate removed from sulfuric acid vessel 15 through conduit 40 is fed to washer 16 where it is washed by water introduced through line 41. The washing solution is removed from washer 16 through conduit 42. It can then be recycled through line 51' to line 51 and washer 12 or recycled through line 42' to vessel 15. While extractor 10, washer 12, and re-extractor 13 are shown as single units in the FIGURE, it will be understood from the present disclosure that they can comprise single or multiple stages as desired.

The following examples are given to illustrate embodiments of the invention as it is presently preferred to practice it. It will be understood that these examples are illustrative, and the invention is not to be considered as restricted thereto except as indicated in the appended claims.

EXAMPLE I

In the liquid-liquid extraction battery 10 comprising four extraction stages, two washing stages 12 for the charged solvent, and one re-extraction stage 13, there is circulated countercurrently in one direction 5 L/h of a nitric effluent obtained from a nitric acid producing plant, and in the opposite direction 2.5 L/h of a solvent substantially comprised of tri-n-octylamine, manufactured by General Mills Company, and tributyl phosphate diluted in kerosene.

The composition of the nitric effluent to be treated by the solvent after acidification is:

| COMPONENT | AMOUNT (g/L) |
|---|---|
| $HNO_3$ | 15.75 |
| $SO_3^{--}$ | 14 |
| $NH_4^+$ | 4.25 |

The solvent entering the extraction through conduit 24 originates in re-extraction stage 13 and has the following composition:

| COMPONENT | AMOUNT (g/L) |
|---|---|
| Tri-n-octylamine ("Alamine 336") | 205 |
| Tributylphosphate (TBP) | 200 |
| $NO_3^-$ | <0.5 |
| Kerosene | Balance |

After extraction of the nitrates, the raffinate in conduit 25 contains calcium sulfate and less than 100 mg/L of nitrate ion after elimination of the ammonia by the lime.

The solvent leaving extractor 10 through conduit 31 and containing a little sulfate is washed in washer 12 with 0.1 L/h of a 30 g/L sodium nitrate solution from conduit 51.

The nitric acid contained in the washed solvent is re-extracted in re-extractor 13 with 0.115 L/h of an ammonia solution containing approximately 185 g/L of $NH_3$. The pH of the ammonium nitrate solution leaving re-extractor 13 through conduit 35 is within the range from 8 to 8.5. In this way 0.130 L/h of solution of 780 g/L ammonium nitrate containing 1.5 g/L of sulfate, or less than 0.2% of sulfate referred to the nitrate, is obtained. The ammonium nitrate has thus been concentrated approximately 40 times.

EXAMPLE II

In the liquid-liquid extraction battery 10 comprising four extraction stages, two washing stages in washer 12 for the charged solvent, and one re-extraction stage in re-extractor 13, there is circulated counter-currently, on the one hand 0.8 L/h of a nitric effluent arising from purification column bases for uranyl nitrate solutions by tributyl-phosphate, and on the other hand 3.2 L/h of a solvent comprised of a mixture of Alamine 336 which is substantially tri-n-octylamine, manufactured by General Mills Company, and of tributyl-phosphate diluted in kerosene.

The composition of the nitric effluent treated by the solvent is:

| COMPONENT | AMOUNT |
|---|---|
| $HNO_3$ | 120 g/L |
| $NO_3^-$ (total) | 180 g/L |
| Na | 12 g/L |
| Mg | 8 g/L |
| Fe | 4 G/L |
| U | <20 mg/L |
| $NH_4$ | 2 g/L |

Before its entry into the extraction stages 10, this effluent in conduit 21 is previously acidified by sulfuric acid from conduit 22 in sufficient quantity to displace all the nitrates bonded to the cations of the solution. To accomplish this, 60 g sulfuric acid (100%) per liter of nitric effluent is used.

The solvent passing to extraction through conduit 24 comes from the re-extraction unit 13 and has the following composition:

| COMPONENT | AMOUNT (g/L) |
|---|---|
| Alamine 336 | 205 |
| Tributylphosphate (TBP) | 200 |
| $NO_3^-$ | <0.5 |
| Kerosene | Balance |

After extraction of the nitrates, the raffinate in conduit 35 contains in the form of sulfate the majority of the cations of the feed solution in conduit 21, the excess of sulfuric acid introduced through conduit 22 and less than 100 mg/L of nitrate ion.

The solvent leaving extractor 10 in conduit 31 and containing a few extracted or entrained impurities such as iron and sulfate ions, is washed in apparatus 12 by 0.15 L/h of a 40 g/L sodium nitrate solution from conduit 51, effluent coming from the purification of uranyl nitrate by tributylphosphate.

The nitric acid contained in the washed solvent is then re-extracted in unit 13 with 0.7 L/h of a 170 g/L ammonium nitrate solution (ammonium diuranate precipitation mother liquors obtained from purification of uranium-bearing concentrates by tributylphosphate).

To this solution, gaseous ammonia is added in sufficient quantity for the pH of the ammonium nitrate solution leaving re-extractor 13 through conduit 35 to be between 8 and 8.5. In this way, there was obtained 0.74 L/h of a concentrated ammonium nitrate solution containing 416 g/L of ammonium nitrate and 2 g/L of sulfate, which is less than 0.5% of sulfate ion, referred to the nitrate.

The nitric solution is thus concentrated approximately 2.3 times and purified.

EXAMPLE III

In this Example, the solvent charged with nitric acid of Example I leaving the extraction battery 10 through conduit 31, obtained under the same conditions as in Example I, is washed by a fraction of dilute nitric acid in conduit 42 coming from the washing of the calcium sulfate cake.

The washed solvent in conduit 32 is then re-extracted by 30% gaseous ammonia from conduit 33, the majority of which comes from reactor 14. Through conduit 35, 0.21 L/h of a 740 g/L ammonium nitrate solution is obtained. This solution is treated in vessel 14 with 74 g/h of $Ca(OH)_2$ and the ammonia produced is recovered and recycled to re-extractor 13 through conduit 33".

The calcium nitrate solution in conduit 37 is treated in vessel 15 with 102 g/h of 96% sulfuric acid, and 0.25 L/h of a 7 M nitric acid solution is obtained in conduit 39, which acid can be reused for attacking uranium-bearing concentrates.

The stream of calcium sulfate in conduit 40, precipitated in vessel 15, is filtered and washed in washer 16, then discarded. A part of the washing liquors is recycled to vessel 15, the other part in conduit 42' being recycled to wash the charged solvent through conduit 51.

Before it is discarded, the aqueous raffinate leaving through conduit 25 is treated in vessel 26 with lime. The ammonia liberated by the lime is carried off in the air and, on the one hand, an effluent liquid which can be discharged, and on the other hand, a solid effluent constituted substantially by metallic hydroxides and sulfate of calcium is obtained.

What is claimed is:

1. A process for purifying nitric effluents containing nitric acid, nitrates, or a mixture thereof, which process comprises
   (a) treating the nitric effluent with a quantity of sulfuric acid in an amount at least equal to the nitrates, to provide a nitric acid solution;
   (b) extracting the nitric acid solution with a liquid extraction agent containing at least one neutral trialkyl phosphoric ester and at least one long-chain alkylamine to load the extraction agent with nitric acid and to provide a sulfate-containing raffinate, and
   (c) re-extracting the loaded extraction agent with ammonia to provide a solution containing ammonium nitrate and a regenerated extraction agent.

2. A process according to claim 1 wherein the extraction agent contains a liquid hydrocarbon with low water solubility and low volatility.

3. A process according to claim 2 wherein the hydrocarbon is aromatic or paraffinic.

4. A process according to claim 2 wherein the hydrocarbon contains from about six to about 19 carbon atoms.

5. A process according to claim 1 wherein lime is added to the ammonium nitrate solution to produce a calcium nitrate solution and sulfuric acid is added to the calcium nitrate solution so obtained to produce nitric acid and precipitated calcium sulfate.

6. A process according to claim 5 wherein the precipitated calcium sulfate is washed with water to produce a dilute nitric acid solution and the solution is recycled to step (b).

7. A process according to claim 1 wherein the regenerated extraction agent is recycled to step (b).

8. A process according to claim 7 wherein the renegerated extraction agent is washed prior to recycling to step (b).

9. A process according to claim 1 wherein the nitric effluent is obtained from the manufacture of nitric acid or from hydrometallurgical treatment of metalliferous ores.

10. A process according to claim 9 wherein the ore contains uranium.

11. A process according to claim 1 wherein the amine is secondary or tertiary.

12. A process according to claim 11 wherein the amine contains from 18 to 36 carbon atoms.

13. A process according to claim 1 wherein the sulfate-containing raffinate separated from the loaded extraction agent is treated with lime to generate gaseous ammonia and cause precipitation of metallic hydroxides corresponding to the metallic cations contained in the raffinate and calcium sulfate.

14. A process according to claim 1 wherein the phosphate is tributyl phosphate.

* * * * *